United States Patent
Hill et al.

(10) Patent No.: US 12,104,643 B2
(45) Date of Patent: Oct. 1, 2024

(54) FRICTION ELEMENT WELD ELEMENT MODIFICATION TO INCREASE CORROSION RESISTANCE OF THERMAL MECHANICAL JOINT

(71) Applicant: Ford Global Technologies, LLC, Dearborn, MI (US)

(72) Inventors: David John Hill, Ann Arbor, MI (US); Amanda Kay Freis, Ann Arbor, MI (US); Nia R. Harrison, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/326,520

(22) Filed: May 31, 2023

(65) Prior Publication Data

US 2023/0304521 A1    Sep. 28, 2023

Related U.S. Application Data

(62) Division of application No. 16/801,298, filed on Feb. 26, 2020, now Pat. No. 11,698,091, which is a division of application No. 15/382,607, filed on Dec. 17, 2016, now abandoned.

(51) Int. Cl.
| | |
|---|---|
| *B23K 20/00* | (2006.01) |
| *B23K 11/00* | (2006.01) |
| *B23K 20/12* | (2006.01) |
| *B23K 35/02* | (2006.01) |
| *F16B 5/08* | (2006.01) |

(Continued)

(52) U.S. Cl.
CPC ............. *F16B 5/08* (2013.01); *B23K 11/0066* (2013.01); *B23K 20/129* (2013.01); *B23K 35/0288* (2013.01); *B23K 2103/166* (2018.08); *B23K 2103/172* (2018.08); *F16B 19/06* (2013.01)

(58) Field of Classification Search
CPC .. B23K 20/1295; B23K 20/127; B23K 20/12; B23K 35/0288; B23K 11/0053; B23K 11/0066
See application file for complete search history.

(56) References Cited

U.S. PATENT DOCUMENTS

| | | | | |
|---|---|---|---|---|
| 2,666,354 A | * | 1/1954 | Dim ...................... | F16B 43/001 206/568 |
| 2,982,166 A | * | 5/1961 | Hobbs .................. | F16B 25/0015 411/959 |

(Continued)

*Primary Examiner* — Erin B Saad
(74) *Attorney, Agent, or Firm* — Burris Law, PLLC

(57) ABSTRACT

A welded structural assembly and method, in one form, includes an upper substrate, a lower substrate adjacent the upper substrate, a fastener, and a sealing member. The fastener includes a shank portion, a first head portion, and a second head portion. The shank portion extends through the upper substrate and into the lower substrate. The shank is welded to the lower substrate. The first head portion has an outer periphery and an underside. The second head portion is frangibly coupled to the first head portion. The sealing member is disposed under the first head portion between the upper substrate and the first head portion. The sealing member contacts the underside and extends beyond the outer periphery such that the sealing member extends radially outward beyond all points of the first head portion.

20 Claims, 9 Drawing Sheets

(51) Int. Cl.
    *B23K 103/16*    (2006.01)
    *F16B 19/06*    (2006.01)

(56) References Cited

U.S. PATENT DOCUMENTS

| | | | | |
|---|---|---|---|---|
| 3,175,454 | A * | 3/1965 | Morse | F16B 33/004 411/542 |
| 3,241,422 | A * | 3/1966 | Heimovics | F16B 33/004 411/959 |
| 3,247,752 | A * | 4/1966 | Greenleaf | F16B 33/004 277/944 |
| 3,399,589 | A * | 9/1968 | Breed | F16B 33/004 411/428 |
| 3,426,394 | A * | 2/1969 | Poupitch | F16B 5/128 219/94 |
| 3,468,732 | A * | 9/1969 | Hewitt | B29C 65/0672 156/154 |
| 3,469,490 | A * | 9/1969 | Pearce, Jr. | F16B 43/001 411/965 |
| 3,557,654 | A * | 1/1971 | Weidner, Jr. | F16B 33/004 411/378 |
| 3,711,347 | A * | 1/1973 | Wagner | F16B 33/004 84/41 |
| 3,897,713 | A * | 8/1975 | Gugle | F16B 25/10 416/213 A |
| 3,958,389 | A * | 5/1976 | Whiteside | F16B 19/04 403/279 |
| 4,091,841 | A * | 5/1978 | Beneker | F16L 55/13 29/402.09 |
| 5,249,882 | A * | 10/1993 | Nagoshi | F16B 35/065 411/959 |
| 5,273,386 | A * | 12/1993 | Luhm | F16B 19/06 29/524.1 |
| 5,297,937 | A * | 3/1994 | Umetani | F01D 5/147 416/232 |
| 5,304,023 | A * | 4/1994 | Toback | F16B 33/004 411/387.3 |
| 5,452,977 | A * | 9/1995 | Terrizzi | F16B 39/225 411/930 |
| 5,636,953 | A * | 6/1997 | Jaeger | F16B 37/043 411/36 |
| 5,975,406 | A * | 11/1999 | Mahoney | B23K 20/1295 228/119 |
| 6,053,682 | A * | 4/2000 | Krauter | F16B 43/001 411/399 |
| 6,460,750 | B1 * | 10/2002 | Coletta | B23K 20/129 228/2.1 |
| 6,626,626 | B2 * | 9/2003 | Hartmann | F16B 41/002 411/353 |
| 6,764,262 | B1 * | 7/2004 | Hargis | F16B 43/001 411/371.1 |
| 6,880,743 | B1 * | 4/2005 | Coletta | B23K 20/1295 228/2.1 |
| 7,048,486 | B2 * | 5/2006 | Schaty | F16B 37/043 411/258 |
| 7,329,077 | B2 * | 2/2008 | Curtis | F16B 35/06 411/188 |
| 8,043,021 | B2 * | 10/2011 | Birkelbach | B23K 20/129 228/114.5 |
| 8,486,508 | B2 * | 7/2013 | Christ | B23K 35/0288 228/114.5 |
| 8,888,426 | B2 * | 11/2014 | Diehl | B29C 65/5057 411/258 |
| 9,056,370 | B1 * | 6/2015 | Matlack | B23K 35/0255 |
| 9,068,583 | B2 * | 6/2015 | Bray | F16B 19/008 |
| 9,272,362 | B2 * | 3/2016 | Matlack | B23K 20/12 |
| 9,297,405 | B2 * | 3/2016 | Diehl | F16B 39/282 |
| 9,409,253 | B2 * | 8/2016 | Matlack | F16L 55/11 |
| 9,452,491 | B1 * | 9/2016 | Littell | F16L 55/13 |
| 9,568,035 | B2 * | 2/2017 | West | F16J 15/14 |
| 9,919,379 | B1 * | 3/2018 | Jang | F16B 5/08 |
| 10,293,428 | B2 * | 5/2019 | Spinella | B23K 35/286 |
| 10,384,296 | B2 * | 8/2019 | Spinella | B23K 11/18 |
| 10,478,916 | B2 * | 11/2019 | Polewarczyk | B23K 20/1235 |
| 10,593,034 | B2 * | 3/2020 | Spinella | B23K 11/0066 |
| 10,710,193 | B2 * | 7/2020 | Werkmeister | B23K 20/127 |
| 10,903,587 | B2 * | 1/2021 | Spinella | B23K 11/20 |
| 11,098,747 | B2 * | 8/2021 | Zimmerman | F16B 35/06 |
| 11,174,892 | B2 * | 11/2021 | Chen | F16B 35/06 |
| 11,698,091 | B2 * | 7/2023 | Hill | B23K 11/0066 228/113 |
| 11,913,486 | B2 * | 2/2024 | Weckerle | F16B 25/0021 |
| 2002/0027156 | A1 * | 3/2002 | Coletta | B23K 20/129 228/114.5 |
| 2003/0136810 | A1 * | 7/2003 | Stevenson | B23K 20/127 228/2.1 |
| 2005/0035183 | A1 * | 2/2005 | Beckford | B23K 20/24 228/164 |
| 2005/0178816 | A1 * | 8/2005 | Stevenson | B23K 20/127 228/2.1 |
| 2005/0244249 | A1 * | 11/2005 | Sussenbach | F16B 25/0047 411/411 |
| 2006/0213954 | A1 * | 9/2006 | Ruther | B21J 15/027 228/114.5 |
| 2007/0048106 | A1 * | 3/2007 | Christ | F16B 37/048 411/82 |
| 2007/0295698 | A1 * | 12/2007 | Hengel | B23K 11/14 219/93 |
| 2010/0173123 | A1 * | 7/2010 | Zardus | F16B 19/1054 156/92 |
| 2010/0186900 | A1 * | 7/2010 | Christ | B23K 20/129 228/2.1 |
| 2011/0289752 | A1 * | 12/2011 | Werthwein | F16B 25/106 411/386 |
| 2012/0107070 | A1 * | 5/2012 | Bongartz | F16B 25/106 411/378 |
| 2013/0047414 | A1 * | 2/2013 | Werthwein | F16B 25/0078 29/525.12 |
| 2015/0217395 | A1 * | 8/2015 | Spinella | F16B 37/061 403/267 |
| 2018/0154426 | A1 * | 6/2018 | Xiao | B23K 20/22 |
| 2018/0162097 | A1 * | 6/2018 | Blaski | B32B 15/088 |

* cited by examiner

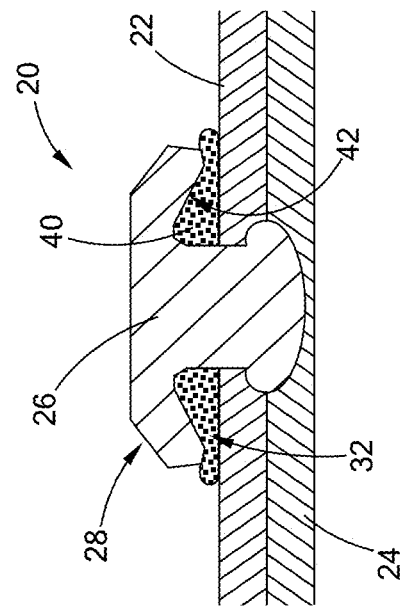
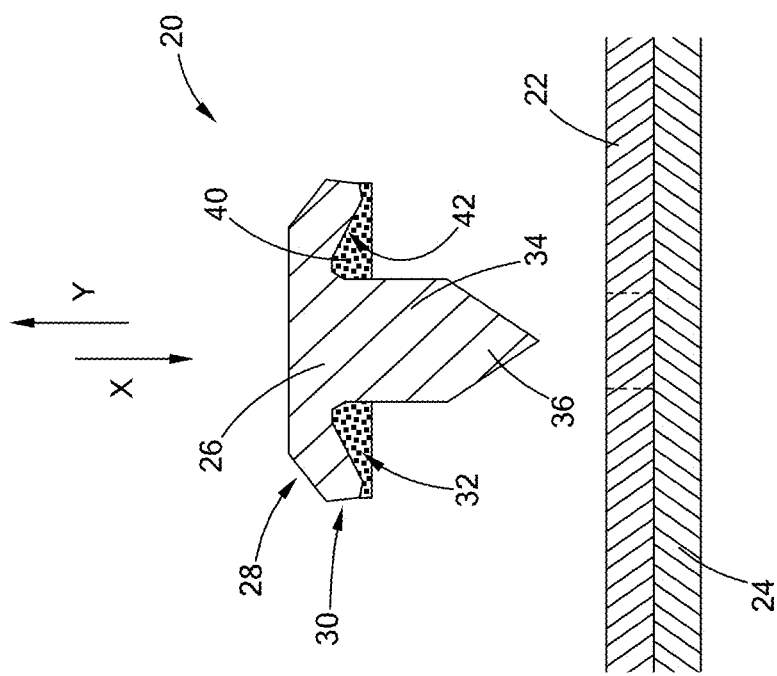
FIG. 2B
FIG. 2A

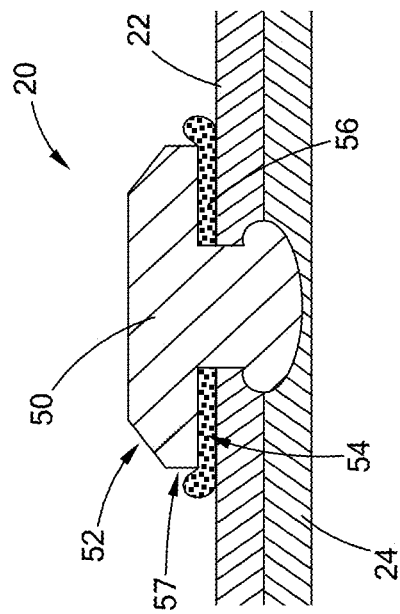
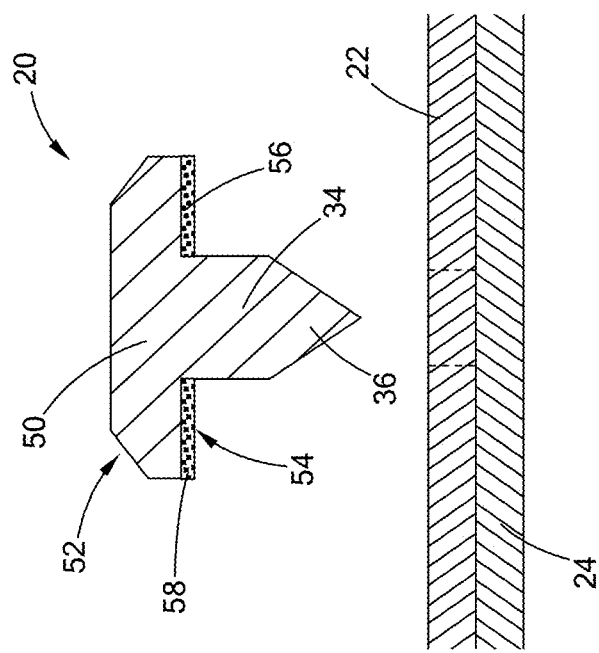

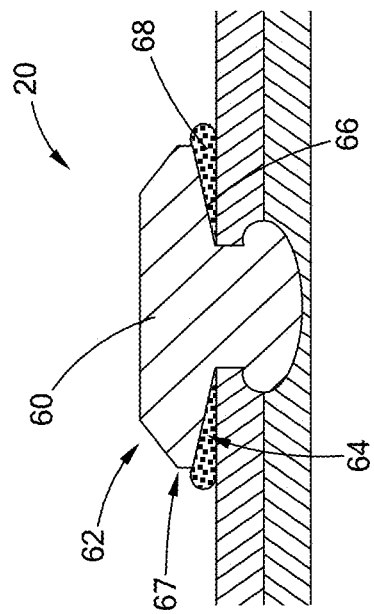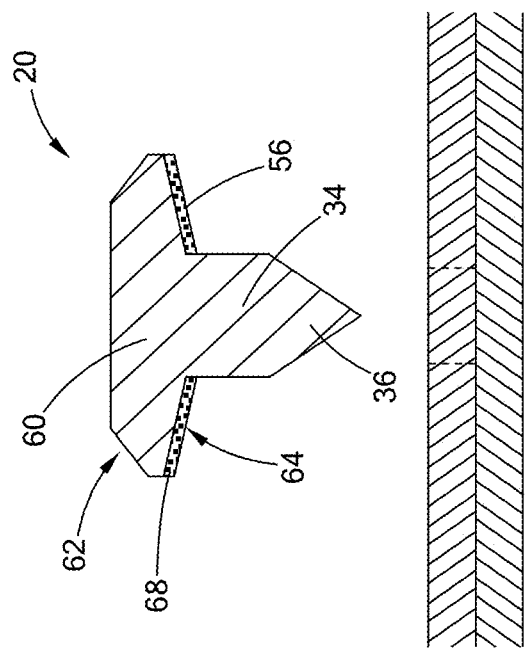

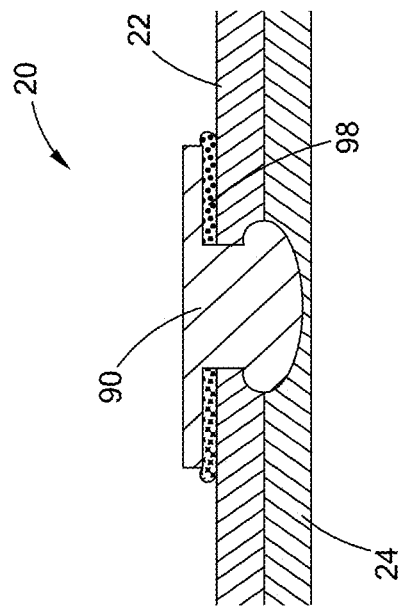
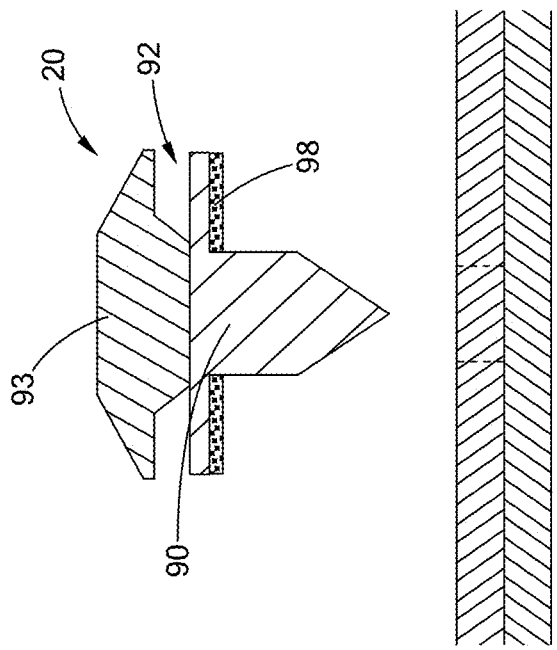
FIG. 7B
FIG. 7A

FRICTION ELEMENT WELD ELEMENT MODIFICATION TO INCREASE CORROSION RESISTANCE OF THERMAL MECHANICAL JOINT

CROSS-REFERENCE TO RELATED APPLICATIONS

This application is a divisional application of U.S. Ser. No. 16/801,298, filed Feb. 26, 2020, which is a divisional application of U.S. Ser. No. 15/382,607, filed Dec. 17, 2016 and titled "Friction Element Weld Element Modification to Increase Corrosion Resistance of Thermal Mechanical Joint," the contents of which are incorporated herein in their entirety.

FIELD

The present disclosure relates generally to fasteners and more particularly to fasteners for use in joining adjacent workpieces with one-sided access.

BACKGROUND

The statements in this section merely provide background information related to the present disclosure and may not constitute prior art.

A variety of structures being joined often require corrosion protection, and this is especially true for automotive assemblies such as body panels. One such technique for joining structures is a friction element welding process, where heat is generated by rotation of a friction element (i.e., fastener) under application of an axial force. The friction element is connected to the structures during partial melting of the friction element, or portions thereof, and the mating structure.

Referring to FIG. 1, an exemplary friction element weld process is illustrated through a series of progressive illustrations, in which a friction element 1 is rotated at high RPMs and applied with an axial force to an upper piece 2 and a lower piece 3. As the friction element 1 is rotated and the axial force is applied, the materials of the upper and lower pieces 2/3 soften, thus allowing the friction element 1 to penetrate these pieces. When the head 4 of the friction element 1 abuts the upper piece 2, the rotation and axial force applied to the friction element 1 are removed, and then the materials of the upper and lower pieces 2/3 harden, or recrystallize, thus forming a mechanical connection between the friction element 1 and the upper and lower pieces 2/3 and a friction welded assembly 5. Such a fastening method can be efficient and economical in high production environments, such as the assembly of automotive body parts/panels.

One known method and fastener for use in this type of friction welding for automotive body parts/panels is the EJOWELD® friction welding method and rivet-type friction element. However, this method can present issues since the interface between the head 4 of the friction element 1 and the structures being joined (upper piece 2/lower piece 3) may be exposed to environmental substances that can penetrate the interfaces and eventually cause corrosion.

This corrosion issue in joined assemblies using a friction welding method and related friction elements/fasteners, among other mechanical joining issues, is addressed by the present disclosure.

SUMMARY

In one form of the present disclosure, a welded structural assembly is provided that comprises at least one upper substrate, at least one lower substrate disposed adjacent the upper substrate, and a fastener extending through the upper substrate and at least partially into the lower substrate. The fastener is welded to the lower substrate and defines a head portion having an outer periphery and an underside. A sealing member is disposed under the head portion, the sealing member contacting the underside and extending beyond the outer periphery. As such, the sealing member provides a seal to inhibit corrosion at or near the interface between the substrates and the fastener.

According to various forms of this welded structural assembly, the sealing member is a coating applied to at least one of the fastener and the upper substrate, and the coating may be a thermoplastic polymer, lead, foam, or paper. The sealing member may also be in the form of a strip of tape, or the sealing member may be a washer. The washer may be a material selected from the group consisting of a thermoplastic polymer, a closed cell foam, a wax-dipped fiber mat, and a non-ferrous metal. In one variant, the head portion of the fastener comprises a recess extending proximally into the head portion, and the sealing member is plastically deformed to fill the recess. In other variants, the underside of the head portion defines a distal face that extends normal to the shank, the underside of the head portion defines a distal face that extends at an obtuse angle relative to the shank, or the underside of the head portion defines a distal face that extends at an acute angle relative to the shank. In another form, there is a second head portion disposed on the head portion, the second head portion configured to shear off during installation of the fastener. The upper substrate may be one of an aluminum material or a magnesium material, and the lower substrate may be a steel material in one form of the welded structural assembly. The fastener may be friction welded or resistance welded to the lower substrate.

In another form, a method of joining at least one upper substrate and at least one lower substrate is provided that comprises the steps of:

placing a fastener at least partially through an aperture formed through the upper substrate;

providing a sealing member between a head portion of the fastener and the upper substrate; and welding the fastener to the lower substrate while simultaneously forming the sealing member under the head portion such that the sealing member extends beyond an outer periphery of the head portion.

In one form of this method, the sealing member is a material that is cured by heat from the welding step during installation of the fastener. Alternately, the sealing member is a material that is cured by a heat source separate from the welding. The separate heat source may be heated air flowing through an installation tool, or the separate heat source may be induction heating of the fastener and sealing element prior to installation. In another variation, the method further includes the step of providing a lateral tooling barrier along the first substrate to control the extension of the sealing member beyond the outer periphery of the fastener.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2A is a cross-sectional view of a fastener and sealing member prior to installation in accordance with one form of the present disclosure;

FIG. 2B is a cross-sectional view of the fastener and sealing member of FIG. 2A after installation;

FIG. 3A is a cross-sectional view of a fastener and sealing member prior to installation in accordance with another form of the present disclosure;

FIG. 3B is a cross-sectional view of the fastener and sealing member of FIG. 3A after installation;

FIG. 4A is a cross-sectional view of a fastener and sealing member prior to installation in accordance with another form of the present disclosure;

FIG. 4B is a cross-sectional view of the fastener and sealing member of FIG. 4A after installation;

FIG. 7A is a cross-sectional view of a fastener having a second head and sealing member prior to installation in accordance with another form of the present disclosure;

FIG. 7B is a cross-sectional view of the fastener and sealing member of FIG. 7A after installation;

Figure 1:
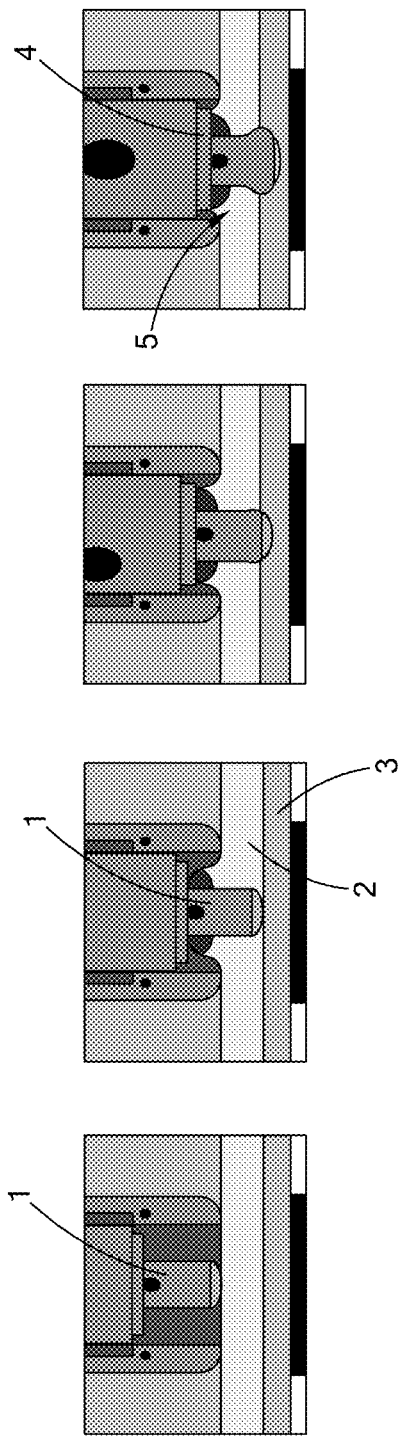
FIG. 1 is a series of progressive cross-sectional views illustrating a friction welded structural assembly and a friction weld element/fastener according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 2A and 2B, a welded structural assembly according to the principles of the present disclosure is illustrated and generally indicated by reference numeral 20. The welded structural assembly 20 includes at least one upper substrate 22, at least one lower substrate 24 disposed adjacent the upper substrate 22 as shown, and a fastener 26 extending through the upper substrate 22 and into the lower substrate 24. As described in greater detail below, the fastener 26 is welded to the lower substrate 24 using a method such as, by way of example, friction welding or resistance welding.

The fastener 26 defines a head portion 28 having an outer periphery 30 and an underside 32, and a shank 34. The fastener 26 also includes a tip 36 that is configured to penetrate the substrates 22/24, which may be conical as shown, or may take on other configurations as known in the art. Further, it should be understood that more than two (2) substrates 22/24 may be joined while remaining within the scope of the present disclosure and thus the illustration of an upper substrate 22 and a lower substrate 24 should not be construed as limiting the scope of the invention.

A sealing member 40 is disposed under the head portion 28 in a pre-installation condition as shown in FIG. 2A. As the fastener 26 is installed, using by way of example a friction welding method as shown in FIG. 1, the sealing member 40 contacts the underside 32 of the fastener 26 and extends beyond the outer periphery 30, thereby sealing the interface between the fastener 26 and the upper substrate 22 and inhibiting the penetration of debris that could lead to corrosion at this joint.

As shown, this fastener 26 comprises a recess 42 that extends proximally into the head portion 28 as shown, wherein the sealing member 40 is plastically deformed during the installation process to fill the recess 42. (As used herein, the term "distally" or "distal" shall be construed to be in the direction of arrow X, and the term "proximally" or "proximal" shall be construed to be in the direction of arrow Y). The presence of a recess 42 provides a space for the sealing member 40 to flow and be captured by the head portion 28 such that the material of the sealing member 40 remains under the head portion 28 for proper sealing of the interface between the fastener 26 and the upper substrate 22. Due to the extremely high RPMs during installation of the fastener 26, the sealing member 40 may have a tendency to depart or fly-away from underneath the head portion 22 under the centrifugal forces. Accordingly, the recess 42 is configured to capture the sealing member 40 and to inhibit its departure from the interface between the fastener 26 and the upper substrate 22 during and after installation.

Referring now to FIGS. 3A and 3B, another form of a fastener for use in the welded structural assembly 20 is illustrated and generally indicated by reference numeral 50. In this form, the fastener 50 includes a head portion 52 with an underside 54 having a distal face 56 that extends normal to the shank 34 as shown. The sealing member 58 thus is first placed under the head portion 52 in a pre-installation condition as shown in FIG. 3A, and then plastically deforms beyond the outer periphery 57 as shown in FIG. 3B after installation of the fastener 50 to seal the interface between the fastener 50 and the upper substrate 22.

As shown in FIGS. 4A and 4B, yet another form of a fastener for use in the welded structural assembly 20 is illustrated and generally indicated by reference numeral 60. In this form, the fastener 60 includes a head portion 62 with an underside 64 having a distal face 66 that extends at an obtuse angle relative to the shank 34 as shown. The sealing member 68 thus is first placed under the head portion 62 in a pre-installation condition as shown in FIG. 4A, and then plastically deforms beyond the outer periphery 67 as shown in FIG. 4B after installation of the fastener 60 to seal the interface between the fastener 60 and the upper substrate 22.

Figure 5A:
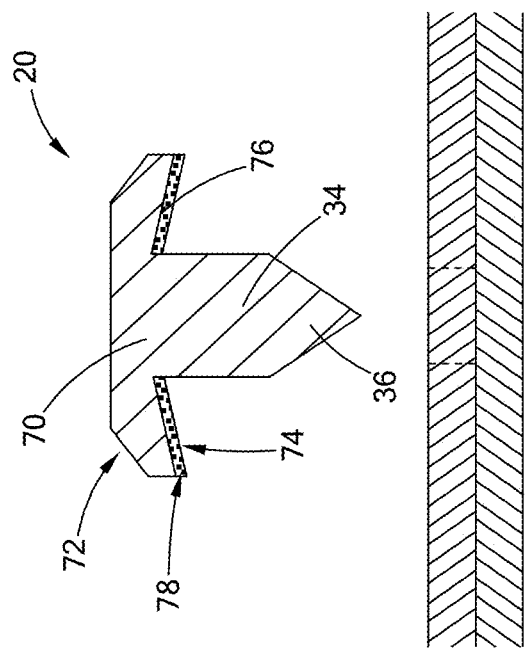
FIG. 5A is a cross-sectional view of a fastener and sealing member prior to installation in accordance with another form of the present disclosure.
Figure 5B:
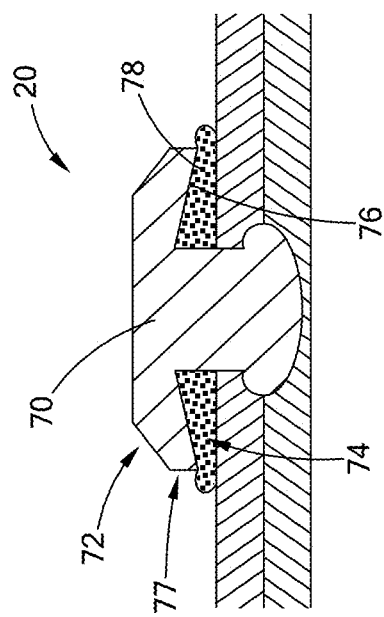
FIG. 5B is a cross-sectional view of the fastener and sealing member of FIG. 5A after installation.

Referring to FIGS. 5A and 5B, another variant of a fastener for use in the welded structural assembly 20 is illustrated and generally indicated by reference numeral 70. In this form, the fastener 70 includes a head portion 72 with an underside 74 having a distal face 76 that extends at an acute angle relative to the shank 34 as shown. The sealing member 78 thus is first placed under the head portion 72 in a pre-installation condition as shown in FIG. 5A, and then plastically deforms beyond the outer periphery 77 as shown in FIG. 5B after installation of the fastener 70 to seal the interface between the fastener 70 and the upper substrate 22.

In the various forms of the welded structural assemblies as illustrated and described, the sealing member may take a variety of forms and materials. For example, the sealing member may be a coating applied to at least one of the fastener and/or the upper substrate 22. The coating may be a material such as, by way of example, a thermoplastic polymer, lead, foam, or paper. Alternately, the sealing member may be in the form of a washer. This washer may be a material such as, by way of example, a thermoplastic polymer, a closed cell foam, a wax-dipped fiber mat, or a non-ferrous metal.

The fasteners as described herein may be friction welded to the substrates, or in another form, the fasteners may be resistance welded to the substrates. One or more of the substrates may contain apertures or pilot holes for placement/location of the fasteners prior to installation. In one form, the upper substrate 22 is one of an aluminum material or a magnesium material, and the lower substrate 24 is a steel material.

Figure 6:
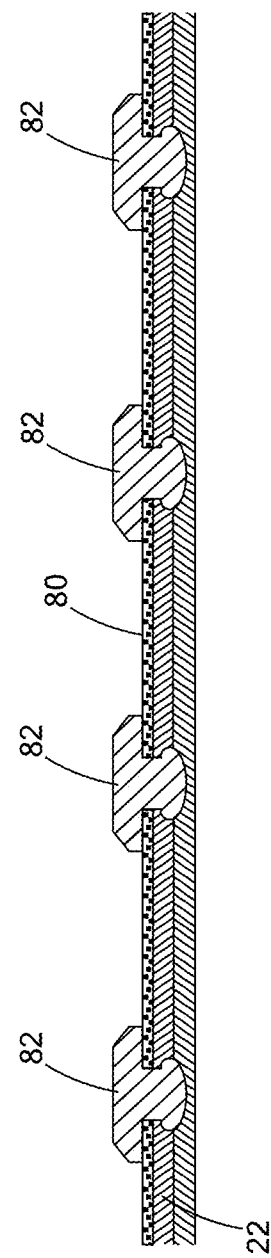
FIG. 6 is a cross-sectional view of a strip of tape forming the sealing member installed with a plurality of fasteners in accordance with one form of the present disclosure.

Referring now to FIG. 6, the sealing member in one form may be a strip of adhesive tape 80, which is located along a line of fasteners 82 for more efficient assembly and sealing. This tape 80 may be applied to the upper substrate 22 or may be applied to a series of fasteners 82 in an installation tool (not shown) prior to installation such that the strip of tape 80 is successively applied as each individual fastener 82, or group of fasteners, is installed.

As shown in FIGS. 7A and 7B, yet another form of a fastener is illustrated and generally indicated by reference numeral 90. This fastener 90 includes a second head portion 93 disposed on the main head portion 92, which is configured to shear off during installation of the fastener 90 as shown in FIG. 7B. In this form, more intimate contact between the sealing element 98 maintains more intimate contact with the upper substrate 22 and is not subjected to direct forces from an installation tool (not shown), thus providing for a more robust sealing of the interface between the fastener 90 and the upper substrate 22.

Figure 8:
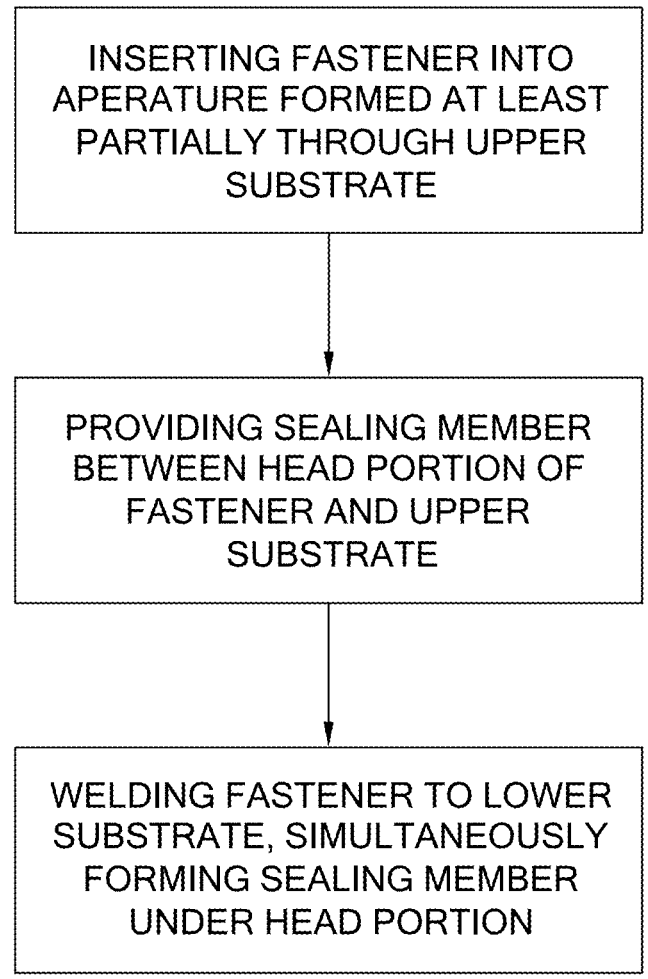
FIG. 8 is a flow chart illustrating a method of joining at least one upper substrate and at least one lower substrate in accordance with the teachings of the present disclosure.

Referring to FIG. 8, a method of joining at least one upper substrate and at least one lower substrate is provided comprising the steps of placing a fastener into an aperture formed at least partially through the upper substrate, providing a sealing member between a head portion of the fastener and the upper substrate, and welding the fastener to the lower substrate while simultaneously forming the sealing member under the head portion such that the sealing member extends beyond an outer periphery of the head portion. The sealing member this seals an interface between the fastener and the upper substrate, thereby inhibiting corrosion.

The aperture is formed at least partially through the upper substrate but could be formed all the way through the upper substrate and even partially into the lower substrate. Although the forms of the present disclosure show the fastener extending and being formed into the lower substrate without completely penetrating the lower substrate, it should be understood that the fastener could penetrate through the lower substrate while being within the scope of the present disclosure. However, in order to reduce the chance of corrosion, it is preferred that the fastener not penetrate completely through the lower substrate.

In this method, the sealing member may be a material that is cured by heat from the welding step during installation of the fastener. Alternately, the sealing member is a material that is cured by a heat source separate from the welding. This separate heat source may be heated air flowing through an installation tool, or the separate heat source may be induction heating of the fastener and sealing element prior to installation.

Figure 9:
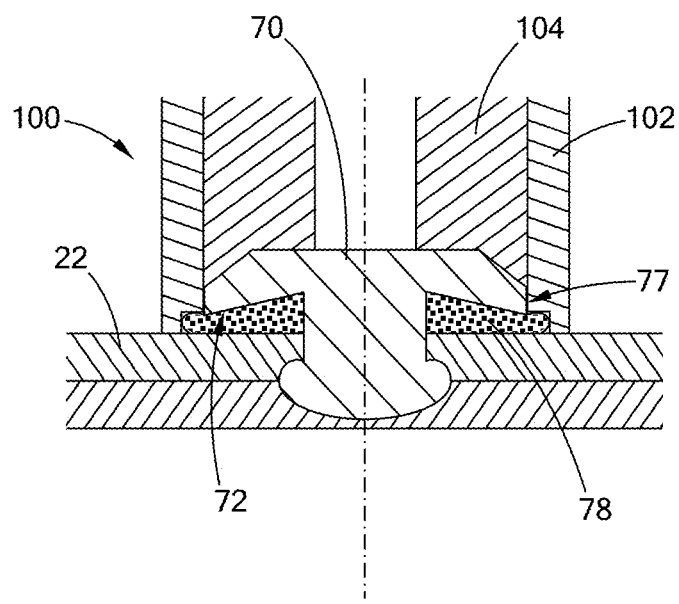
FIG. 9 is a cross-sectional view of a lateral tooling barrier for use in controlling a sealing member and constructed in accordance with the teachings of the present disclosure.

Referring now to FIG. 9, one form of an installation tool is illustrated and generally indicated by reference numeral 100. The installation tool 100 includes a lateral tooling barrier 102 disposed along the upper substrate 22 and adjacent to a drill bit 104 to control extension of the sealing member 78 beyond the outer periphery 77 as shown. With this lateral tooling barrier 102, the previously mentioned tendency of the sealing member 78 to depart or fly-away from underneath the head portion 72 under effect of the centrifugal forces may be reduced.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A welded structural assembly comprising:
   an upper substrate;
   a lower substrate disposed adjacent the upper substrate;
   a fastener including a shank portion and a head portion, the shank portion extending through the upper substrate and into the lower substrate, wherein the shank portion is welded to the lower substrate, the head portion having an outer periphery and an underside, wherein the underside has a distal face that is between the shank portion and the outer periphery and opposes the upper substrate wherein the distal face extends from the shank portion to the outer periphery in a manner such that a distance between the distal face and the upper substrate increases with increased distance from the shank portion; and
   a sealing member disposed under the head portion between the upper substrate and the head portion, the sealing member contacting the underside and extending beyond the outer periphery such that the sealing member extends radially outward beyond all locations of the head portion.

2. The welded structural assembly according to claim 1, wherein the sealing member is selected from the group consisting of a thermoplastic polymer, lead, foam, a wax-dipped fiber mat, a non-ferrous metal, and paper.

3. The welded structural assembly according to claim 1, wherein the sealing member is a strip of tape.

4. The welded structural assembly according to claim 1, wherein an upper side of the head portion is flat.

5. The welded structural assembly according to claim 1, wherein the distal face extends from the shank portion to the outer periphery.

6. The welded structural assembly according to claim 1, wherein the distal face extends at an obtuse angle relative to the shank portion.

7. The welded structural assembly according to claim 6, wherein the obtuse angle is constant from the shank portion to the outer periphery.

8. The welded structural assembly according to claim 1, wherein the head portion includes a tool engagement portion configured to engage a rotary tool to be rotated about an axis of the fastener.

9. The welded structural assembly according to claim 1, wherein the upper substrate is one of an aluminum material or a magnesium material, and the lower substrate is a steel material.

10. A method of joining an upper substrate and a lower substrate comprising the steps of:
    providing a sealing member between an underside of a head portion of a fastener and the upper substrate, wherein the underside has a distal face between a shank portion of the fastener and an outer periphery of the head portion, the distal face opposing the upper substrate and extending from the shank portion to the outer periphery in a manner such that a distance between the distal face and the upper substrate increases with increased distance from the shank portion; and rotary friction welding the fastener such that a shank of the fastener extends through the upper substrate and is welded to the lower substrate and simultaneously forming the sealing member under the head portion such that the sealing member extends radially outward beyond all locations of the head portion.

11. The method according to claim 10, wherein the sealing member is a material that is cured by heat from the rotary friction welding step during installation of the fastener.

12. The method according to claim 10 further comprising curing the sealing member with a heat source separate from the rotary friction welding.

13. The method according to claim 12, wherein the heat source separate from the rotary friction welding is heated air flowing through an installation tool.

14. The method according to claim 12, wherein the heat source separate from the rotary friction welding is induction heating of the fastener and sealing element.

15. The method according to claim 10 wherein the step of rotary friction welding the fastener includes rotating a tool engagement portion of the fastener with rotary tool and surrounding the head portion with a lateral tooling barrier that limits the sealing member from extending beyond a predetermined diameter that is radially outward of all locations of the head portion.

16. The method according to claim 10, wherein the sealing member contacts the distal face.

17. The method according to claim 10, wherein the distal face extends from the shank portion to the outer periphery.

18. The method according to claim 10, wherein the distal face extends at an obtuse angle relative to the shank portion.

19. The method according to claim 18, wherein the obtuse angle is constant from the shank portion to the outer periphery.

20. The method according to claim 10, wherein, after the rotary friction welding, the seal member is sandwiched between the distal face and a portion of the outer surface of the upper substrate, the portion of the outer surface being planar.

* * * * *